United States Patent [19]
Teng

[11] Patent Number: 5,840,231
[45] Date of Patent: Nov. 24, 1998

[54] VALVE GATE ASSEMBLY

[75] Inventor: Alex Teng, Etobicoke, Canada

[73] Assignee: Husky Injection Molding Systems Ltd., Canada

[21] Appl. No.: 912,950

[22] Filed: Aug. 14, 1997

[51] Int. Cl.$^6$ ................................................. B29C 45/38
[52] U.S. Cl. .................. 264/154; 264/328.1; 264/328.9; 425/564; 425/566; 425/577; 425/810
[58] Field of Search ..................................... 264/154, 155, 264/161, 106, 107, 328.1, 328.9, 328.15; 425/562, 563, 564, 565, 566, 549, 577, 810, 571

[56] References Cited

U.S. PATENT DOCUMENTS

| | | | |
|---|---|---|---|
| 4,340,353 | 7/1982 | Mayer | 264/106 |
| 4,368,028 | 1/1983 | Grish et al. | |
| 5,068,065 | 11/1991 | Maus et al. | 264/106 |
| 5,162,125 | 11/1992 | Akselrud et al. | |
| 5,324,190 | 6/1994 | Frei | 264/107 |
| 5,423,672 | 6/1995 | Gordon | 264/107 |
| 5,460,763 | 10/1995 | Asai | 264/107 |
| 5,690,974 | 11/1997 | Miyairi | 264/107 |

*Primary Examiner*—Jill L. Heitbrink
*Attorney, Agent, or Firm*—Bachman & LaPointe, P.C.

[57] ABSTRACT

A valve gate assembly including a movable valve stem for guiding molten resin to a molding area, a nozzle body portion enclosing the valve stem and a mold cavity for receiving molten plastic to form a molded part formed between cooperating first and second mold halves. An injection orifice is provided downstream of the valve stem communicating with the mold cavity for transfer of the molten plastic to the mold cavity, and a movable core pin is provided contacting the valve stem and movable between a forward position opening the injection orifice and a rearward position closing the injection orifice.

22 Claims, 15 Drawing Sheets

VALVE GATE ASSEMBLY

BACKGROUND OF THE INVENTION

This invention is directed to a valve gate assembly for the injection molding of high quality molded articles of various shapes, and more particularly, to an assembly for the molding of molded articles which permits a better filling pattern of the mold cavity to make a substantially stress free part. The present invention also provides an efficiently operating valve gate assembly, especially in combination with a system for guiding molten resin to a molding area.

Copending U.S. patent application Ser. No. 08/690,411 discloses a valve gate injection nozzle including a valve stem means for guiding molten resin to a molding area, the valve stem means including an input area for receiving molten resin, a central area following the input area for processing the molten resin and an output area following the central area for connection of the nozzle with the molding area. The central area includes a first zone for splitting the molten resin into a plurality of streams, a second zone for mixing and homogenizing the molten resin, and a third zone for combining the plurality of streams and forming recombined and substantially homogenized molten resin for subsequent direction to the output area. This apparatus is quite advantageous; however, it is desirable to obtain improvements in the valve gate assembly.

U.S. Pat. No. 5,162,125 shows a large diameter valve gate having an annular filling passage. However, the design of this patent uses springs to close the annular filling passage, and opens by the forward motion of the machine nozzle contacting the sprue and compressing the spring. Thus, the valve head moves forward into the part to allow filling and retracts away from the part to close, leaving a space between the valve head and the part. Although a hole is not cored in the part, the valve head is used to form an annular projection in the part. In the open position, the melt flows through the comparatively wide annular passage. While this is an effective device, it is desirable to develop an improved system.

U.S. Pat. No. 4,368,028 teaches using a core pin to form a hole in a part opposite a fixed "torpedo" in a hot runner nozzle wherein there is a conical projection and a matching conical depression on the core pin and torpedo to cause them to engage and remain aligned during molding. However, there is no teaching of closing the gate opening.

As is known in the art, during injection molding of articles such as PET preforms, unidirectional molecular orientation and weld lines are difficult to avoid using previously developed hot runner valve gated nozzle designs. This defect of these designs presents a major source of concern as such weld lines and unidirectional orientation are potential causes for the weakness of a blown PET bottle that may subsequently be filled with a carbonated beverage under pressure, thereby increasing the risk of a container rupture. In addition, weld lines may also reduce the strength or have an adverse effect on the dimensional accuracy of injection molded precision parts such as gears, which have a central hole, especially those used for high load applications. Also, for articles used in optical applications, such as the compact disc (CD) and digital video disc (DVD), weld lines and unidirectional molecular orientation induce birefringence, which is an unacceptable defect given the fact that information carried by pits embedded in the surfaces of these discs has to be retrieved by passing a laser beam through the plastic substrate from which they are formed, from a side located opposite the pits. Injection molding of CDS and DVDs is even more challenging, considering that both of these molded articles must have a precisely located central hole. Ideally, CDS and DVDs should be molded using a sprueless injection process in order to save plastic resin, reduce the cycle time and simplify the design of the mold and the injection molding machine. The former developments in the art, however, fail to teach such a system and more particularly, fail to teach a hot runner valve gate nozzle and mold, and method which are capable of spruelessly producing CD's and DVD's with an acceptable birefringence level and within tight geometrical tolerances.

Prior developments in the molding art discuss various method for producing plastic articles which do not present weld lines or unidirectional molecular orientation. However, these method do not provide satisfactory results with regard to using hot runner manifolds and nozzles.

Some of the more pertinent developments in the art are discussed as follows.

With the intent to reduce the contact between the movable stem and molten resin so as to prevent the appearance of weld lines caused by splitting of the molten resin around a valve stem, U.S. Pat. No. 4,412,807 to York discloses a valve stem located parallel to the flow of the molten resin. The valve stem therein has very limited contact with the resin which is very close to the nozzle tip. While weld lines are reduced using this design, a substantial core shift is introduced because the flow of the resin is not symmetrical with respect to the cavity gate and there is a tendency for the resin to preferentially fill one side of the cavity faster then the other.

Similar to York, U.S. Pat. No. 4,925,384 to Manner discloses a hot runner valve gate which also includes a valve stem positioned parallel to the flow of the molten resin. However, this stem is only in partial contact with the molten resin along the inner melt channel of the hot runner nozzle. The melt does not fully surround the stem, thus giving a slight improvement with respect to the appearance of weld lines. However, since the melt channel is again laterally shifted with respect to the cavity gate, some weld lines and core shift still appear. In addition, guiding the stem only by the upper portion thereof represents another drawback of this system.

Further, U.S. Pat. No. 5,104,307 to Brink teaches a valve gate stem that makes an angle with respect to the flow of the molten resin and acts upon a ball shaped closing pin. By using this design, there is no contact between the stem and the resin. However, this design clearly increases the size of the hot runner nozzle, is very difficult to seal with respect to leakage around the ball shaped pin, and cannot be used in many applications such as in cases where molded articles are to be formed having a precisely located central hole.

Another approach to improve the quality of plastic articles and to prevent the formation of weld lines has been to use non-valve gated hot runner nozzles, as disclosed in U.S. Pat. No. 4,965,028 to Maus et al. An extended reference list to patents directed to this type of approach is also discussed in this patent. Maus et al. discloses and claims a melt conditioning elements comprising heating, filtering and mixing features located just upstream of the molded gate. These features are proposed to improve the quality of the melt and accordingly, the quality of the plastic article to be molded. This mixing feature as disclosed and Maus et al. is not entirely new to that disclosure and reference is accordingly made to German Patent Application DE3201710 A1 of Gellert.

Gellert teaches a generic twisted strip located in the nozzle which is used to produce turbulence and to reduce uniaxial properties in the molded articles. The mixing element of Gellert is not very effective since it does not split and remix the molten resin flow aggressively enough to prevent the formation of weld lines, which are caused by the splitting and twisting of the incoming stream of molten resin into multiple streams that reach the cavity. The melt conditioning element of Maus et al. is, however, more effective as a mixer but causes a relatively high and nondesirable pressure drop that increases the cycle time of the injection molding machine. For both of the hot runners disclosed in Maus et al. and Gellert, valve gate stems are not used and accordingly, these devices have a substantially limited range of application.

Still another approach for avoiding the unidirectional molecular orientation of melt is shown in several patents which teach different manners for inducing helical movement to the molten resin around the stem of a hot runner valve gate. Accordingly, reference is made to U.S. Pat. No. 4,303,382 of Gellert that teaches three helical channels located in the inner wall of the nozzle that surrounds a valve stem. These channels end up just prior to the tip of the nozzle and are used to impose a curving motion to the melt when it enters the mold cavity. While this design will avoid unidirectional molecular orientation of the molten resin, it will not prevent the formation of weld lines since the three streams of molten resin are not mixed together before entering the cavity.

Other molding applications require the inducement of circular or helical movement of the molten resin where the molten resin must have a very limited amount of contact with the stem of the valve gate. Such applications include the simultaneous coinjection of several molten resins to a common gate. For example, reference is made to U.S. Pat. No. 4,512,730 of Kudert and U.S. Pat. No. 5,143,733 of Von Buren. Kudert teaches a complex hot runner nozzle design concept wherein the annular flow profile of each molten resin that arrives in the hot runner nozzle is transformed into a circular or helical profile that is totally separated from the valve gate stem. By inducing concentric movements of each individual resin for their simultaneous injection, the combined stream entering the cavity mold would fully surround each nozzle and accordingly, the layers of the streams fill the entire cavity. Von Buren teaches a different valve gate hot runner nozzle for coinjecting three resins through a single mold gate, wherein only one of the resins follows a quasi circular flow. With reference to FIG. 3, channel (104) has a helical profile that allows one thin stream of resin to fully surround nozzle body (83) for causing the same to reach the gate as a complete symmetrical molten resin stream. Neither Kudert nor Von Buren teach a valve gate hot runner that is capable of effectively mixing and homogenizing a single stream of molten resin so as to prevent the formation of weld lines in the final molded product.

With reference to U.S. Pat. No. 4,340,353 to Mayer, U.S. Pat. No. 5,324,190 to Frei and U.S. Pat. No. 5,460,763 to Asai, several sprueless injection molding methods for manufacturing compact discs having an accurate central hole are disclosed. However, no provision is made to avoid the appearance of weld lines or to avoid unidirectional molecular orientation of the melt. Specifically, Mayer teaches a plurality of radially outwardly and angularly spaced extending arms (76) and (78) used to guide a valve stem (74) along two sections. These arms, together with flow opening (89) represent obstructions of the incoming flow of molten resin, toward the mold cavity, which generate several melt lines that are visible using polarized light. Less visible weld lines are expected to be generated using the design taught in Frei and Asai since they do not have these kind of guiding arms disturbing the flow of the resin. However, neither patent teaches any means to recombine the individual streams of molten resin after they are split and prior to entering the cavity gate, so as to provide a viable solution for avoiding the appearance of weld lines. All three of these patents teach different methods and means to form a central hole in a time efficient and simple manner without discussing the high potential in each for injecting compact discs that have weld lines and unidirectional molecular orientation in the solidified resin.

The difficulty which arrives in removing weld lines caused by the interruption or splitting of the flow of plastic material is emphasized in U.S. Pat. No. 4,942,010. In this patent, a simple but very limited mixing solution for reducing weld lines is disclosed. Further disclosure which indicates the difficulty in eliminating weld lines is found in U.S. Pat. No. 4,584,154 discussing that polycarbonate, a material frequently used in molding CDS, is very sensitive to the formation of weld lines caused by the first splitting and then reuniting of separate streams.

There exists a need, therefore, for an apparatus for use in sprueless injection molding operations for molding high quality molded parts, and particularly, high quality molded parts having a precisely located central hole, wherein the molded part is substantially free of solidified resin having unidirectional molecular orientation and which is also free of weld lines. There is a particular need for such an apparatus with an efficiently operating valve gate assembly.

SUMMARY OF THE INVENTION

The primary object of this invention is to provide an improved apparatus for the sprueless injection molding of high quality plastic articles.

Another object of this invention is to provide an apparatus that permits a better filling pattern of the mold cavity to make a substantially stress free part.

Yet another object of this invention is to provide an apparatus for the injection molding of high quality plastic articles using an efficient and expeditious valve gate assembly.

Further objects and advantages of the present invention will appear hereinbelow.

The foregoing objects and advantages are obtained in accordance with the process and valve gate assembly of the present invention. The valve gate assembly comprises: a movable valve stem for guiding molten resin to a molding area; a nozzle body portion enclosing said valve stem; channel means for molten plastic enclosed by said nozzle body; a mold cavity for receiving molten plastic to form a molded part formed between cooperating first and second mold halves; an injection orifice downstream of the valve stem communicating with said mold cavity and channel means for transportation of molten plastic from the channel means to the mold cavity; and a movable core pin contacting said valve stem and movable between a forward position opening said injection orifice and a rearward position closing said injection orifice.

The valve stem is situated in the first mold half, and the core pin is situated in the second mold half. The valve stem is movable from a forward position blocking said injection orifice to a rearward position opening the injection orifice. The core pin is operative to move the valve stem from a forward position to a rearward position.

The valve gate assembly of the present invention is particularly advantageous when the valve stem includes an input area for receiving the molten resin, a central area following the input area for processing the molten resin and an output area following the central area for connection of the nozzle with the molding area. The central area includes a first zone for splitting the molten resin into a plurality of streams, a second zone for mixing and homogenizing the molten resin, and a third zone for combining the plurality of streams and forming recombined molten resin for subsequent direction in a homogenized state to the output area. The nozzle further includes a nozzle body portion for enclosing the valve stem, wherein the nozzle body portion includes means for heating the resin.

The details of the present invention are set out in the following description and drawings wherein like reference characters depict like elements.

DETAILED DESCRIPTION OF THE PREFERRED EMBODIMENT

Figure 1:
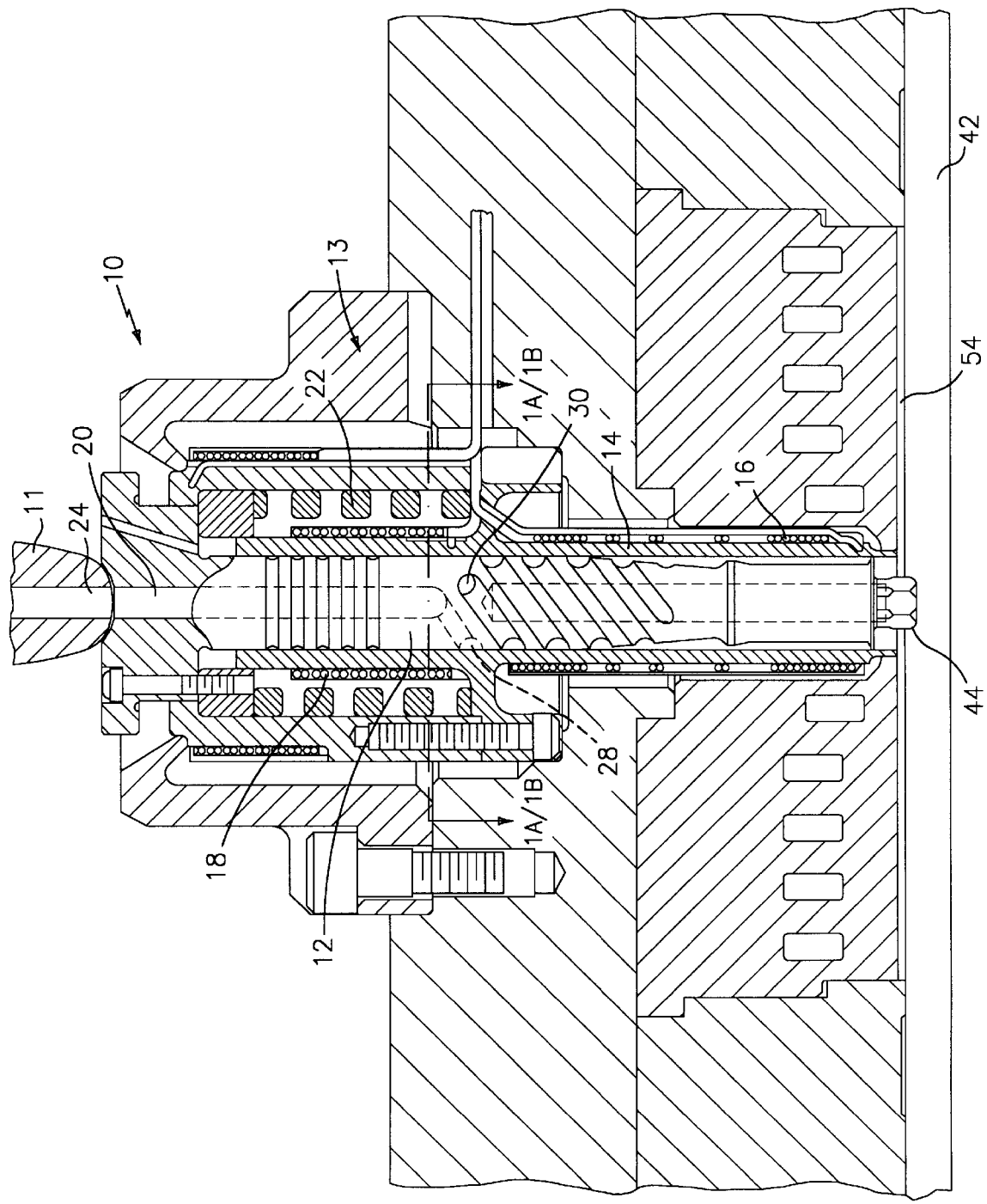
FIG. 1 is a cross-sectional view of a valve gate nozzle according to the principles of the present invention for use with an injection molding machine and an associated nozzle for making molded articles having a precisely located central hole, such as compact and digital video discs.

Referring now to the drawings in detail, there is shown in FIG. 1 a cross-sectional view of a hot runner valve gate, designated generally as 10, as it works actuated and in conjunction with machine nozzle 11 of an injection molding machine (not shown), in accordance with the principles of the present invention. In general, hot runner valve gate 10 comprises injection nozzle 13 and includes a valve gate stem 12 located in an elongated cylindrically shaped nozzle body 14, wherein nozzle body 14 is made of a heat conductive material and is surrounded by lower heating elements 16 and upper heating elements 18, which are used to maintain the molten resin at the optimal temperature required by the injection molding process.

Valve gate stem 12 includes an inner melt conduit 20 which allows for the free access of the injected molten resin inside the nozzle body 14. As is further shown generally in FIG. 1, upper heating elements 18 are surrounding by a spring 22 which is used to maintain a tightly sealed contact between the entrance end 24 of valve gate stem 12 and a molten resin sequential feeding device, such as injection molding machine nozzle 11, for feeding resin into inner melt conduit 20. During the injection molding process, valve gate stem 12 is axially displaced within nozzle body 14 so as to allow the flow and shut off the flow of molten resin into the cavity mold 42.

Figure 2:
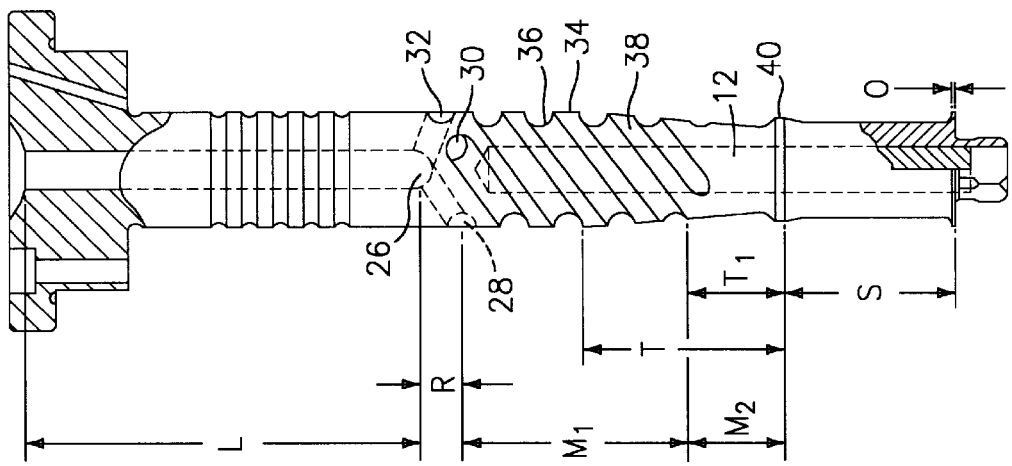
FIG. 2 is a cross-sectional view of another embodiment of a valve gate nozzle in accordance with the principles of the present invention for use in conjunction with an injection molding machine for making molded articles which are free of weld lines and/or unidirectional molecular orientation.

Valve gate stem 12 in accordance with the principles of the present invention includes a plurality of innovative design features which contribute to the substantial elimination of weld lines and/or of unidirectional molecular orientation of the molten resin used to form a molded plastic article. Referring to FIG. 2, valve stem 12 is shown as including a plurality of functional axial zones which are used to substantially accomplish the elimination of weld lines and/or the disruption of unidirectional molecular orientation of the resin therein, in the final molded product. In accordance with the following description, the plurality of functional zones uniquely function together in creating a stream splitting, three-dimensional mixing and recombination technique for substantially homogenizing molten resin flowing adjacently thereto. These zones include radial splitting zone R, first mixing zone M1, second mixing zone M2, straight zone S, and flow cut-off zone O.

Figure 1A:
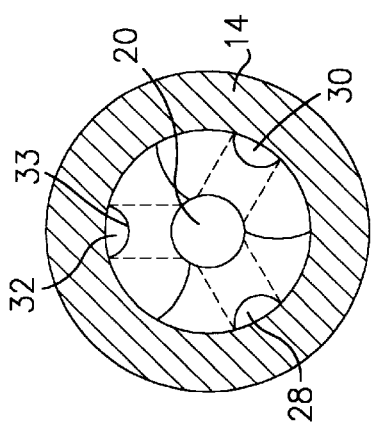
FIG. 1A is a cross-sectional view of one embodiment of the entrance opening arrangement of the valve stem shown in FIG. 1.
Figure 1B:
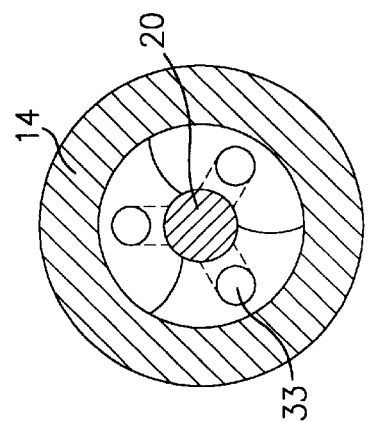
FIG. 1B is a cross-sectional view of another embodiment of the entrance opening arrangement for the valve stem shown in FIG. 1.

Accordingly, and also referring to FIG. 2, molten resin enters under pressure inner melt conduit 20 and travels substantially undisturbed over a distance L until it reaches a radial melt splitter 26 in a first radial splitting zone R. Melt splitter 26 has been specially designed to provide substantially no pressure drop of the molten resin downstream of melt conduit 20 and thus to maintain a high molding cycle time. In one preferred embodiment, melt splitter 26 comprises a plurality, and in this embodiment, preferably three annular melt conduits 28, 30 and 32, defined initially by entrance openings 33, as shown in FIGS. 1A and 1B. These conduits 28, 30 and 32 are angularly spaced in valve stem 12. All three conduits 28, 30 and 32 of radial melt splitter 26 are in direct fluid communication with outer surface 34 of valve gate stem 12.

As shown in FIG. 1A, the molten resin may be split into at least two, and preferably three or more individual streams using radially spaced orifices or entrance openings 33 that are made exterior to the stem, i.e. between the stem 12 and the nozzle body 14. Alternatively, as shown in FIG. 1B, the streams of molten resin may be led fully into the stem before directing them outside towards the helical channels. That is, the entrance openings 33 in FIG. 1A are fully formed within the body of the stem and are not formed in part by nozzle body 14.

Accordingly, incoming molten resin which reaches radial melt splitter 26 as one tubular flow stream, and which carries the heat history of the entire travel of the streams through the manifold and nozzle of the injection molding machine, is divided by radial melt splitter 26 into a plurality of equal streams, and preferably three streams in accordance with conduits 28, 30 and 32 with substantially no pressure drop to the molten resin. Accordingly, three streams of molten resin simultaneously reach outer surface 34 at the beginning of the first mixing zone M1 of valve gate stem 12. Since no pressure loss occurs, each stream of molten resin is forced by the pressure to enter one of helical inner channels 36, which are precisely formed in outer surface 34 of valve gate stem 12 along first mixing zone M1, as shown in FIGS. 1 and 2. Mixing zone M1 of valve gate stem 12 is tapered starting from the upper end of area T and down to the upper end of second mixing zone M2. The taper of area T continues through second mixing zone M2, to straight zone S. Due to the tapering of valve gate 12 in mixing zone M1 starting in tapered area T, over a portion of the axial length of helical channels 36, a certain amount of molten resin from each stream undergoing a helical travel in mixing zone M1 is injected over barrier flights 38 separating the helical channels. Accordingly, a three-dimensional mixing process occurs. That is, in addition to the helical displacement of the molten resin along the three different helical channels, the movement of the molten resin over barrier flights 38 creates a mixing process for portions of the individual streams injected over the barrier flights, while the remaining portions of the individual streams continues its helical path. Eventually, in zone M2 and tapered area T1, which is a smoothly tapered area without the helical channels, a single homogenized stream of molten resin is formed, having circular flow which fully surrounds the outer surface of valve gate stem 12. In this manner, molten resin as a singular circular flow stream resides for a short period of time between nozzle body 14 and valve gate stem 12 at lower tapered area T1 as a single homogenized molten stream that substantially does not include any resin having unidirectional molecular orientation.

As shown in FIGS. 1 and 2, tapered area T ends with an outwardly extending dam 40 which functions to partially obstruct and as a result thereof, partially send backward the homogenized molten resin into tapered area T, prior to the entrance of the homogenized molten resin into the straight zone S of valve gate stem 12. In this manner, further mixing of the molten resin is achieved so as to further assure the elimination of unidirectional molecular orientation. Accordingly, in straight zone S a single stream of highly homogenized molten resin surrounds valve gate stem 12 and is now properly prepared and directed for injection into mold cavity 54, shown schematically in FIG. 1. In this respect, the highly homogenized molten resin residing for a short period of time in straight zone S does not have unidirectional molecular orientation and when injected into mold cavity 54, does not exhibit any weld lines that usually appear using formerly developed hot runners and their respective valve gates.

A final cut-off zone O is also provided, as shown in FIG. 2 (and more clearly in FIG. 5E), for shutting off the gate and the flow of molten resin to mold cavity 54. Accordingly, zone O preferably comprises a circular surface having a diameter for nearly engaging the inner diameter of nozzle housing 14, for cutting off the flow of molten resin through nozzle housing 14, adjacent valve gate stem 12 into the mold cavity 54. Therefore, upon the upward actuation of valve stem 12 into nozzle housing 14, as described below with reference to FIGS. 5A–5D, cut-off zone O substantially engages the inner diameter of housing 14 for cutting off molten resin flow.

As shown in FIG. 1, valve gate injection nozzle 13 also includes a tip 44. Tip 44 is used in molding situations wherein the injection nozzle 13 is to be used to make molded articles requiring a precisely positioned central hole, such as in the production of compact and digital video discs and precision gears, which also require and/or are preferably formed from molten resin having homogeneous molecular orientation. Accordingly, the gate injection nozzle 13 shown in FIG. 1 is very suitable for injecting polycarbonates and excellent results have been obtained for such applications, providing the sprueless injection molding of compact and digital audio discs having no weld lines caused by a stream splitting.

Figure 3:
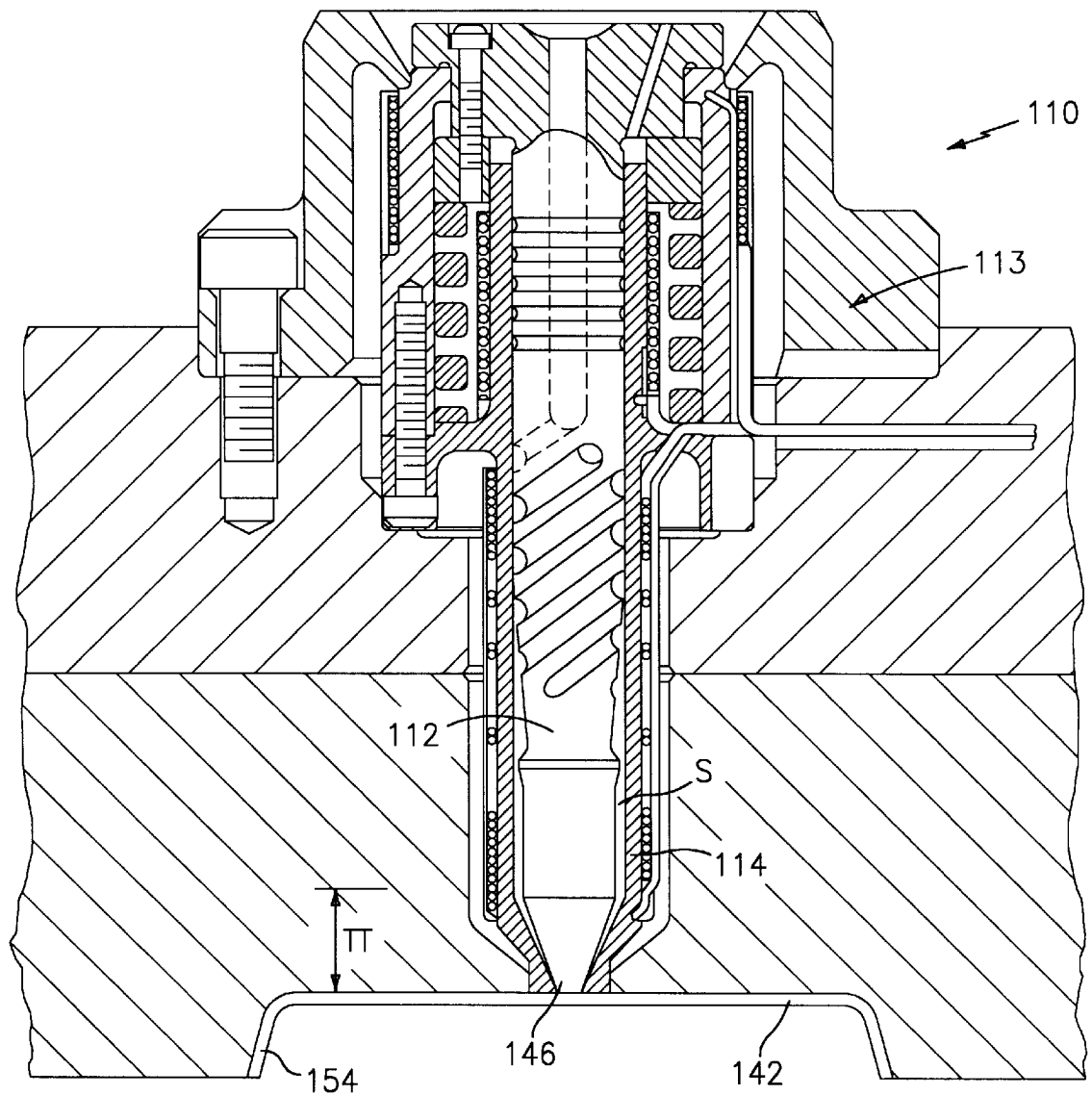
FIG. 3 is an elevated and partially cross-sectional view of a valve gate stem in accordance with the principles of the present invention.

Referring now to FIG. 3, a hot runner valve gate 110, valve stem 112, nozzle body 114, cavity mold 142 and valve gate injection nozzle 113 are shown which have a design very similiar to that shown in FIG. 1. The primary and substantially only difference between valve gate injection nozzle 113 and valve gate injection nozzle 13 is the lack of tip 44 and the substitution therefor of a further tapered area TT after straight zone S instead of tip 44. Accordingly, tapered zone TT forms tip 146 which allows for the flow of molten resin from straight zone S in the very homogenized state to mold cavity 154 without the formation of a precisely aligned central hole.

Figure 4:
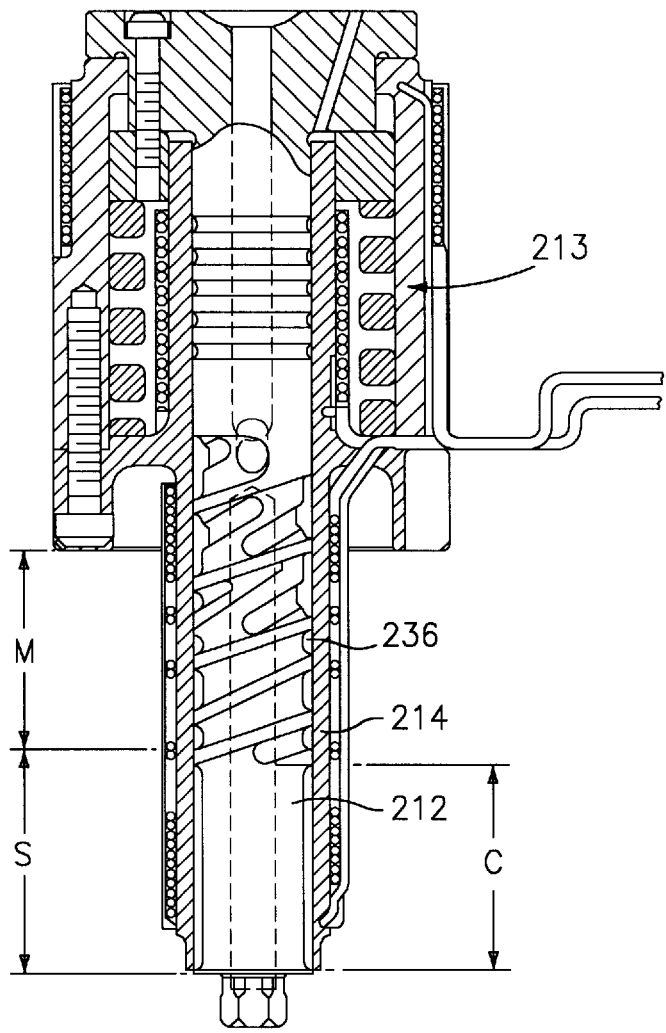
FIG. 4 is an elevational and cross-sectional of another embodiment of a valve gate stem in accordance with the principles of the present invention.

Referring now to FIG. 4, a valve gate injection nozzle 213 and nozzle body 214 are shown which are similar to the embodiment shown in FIGS. 1 and 3 and is preferably used for injecting plastic materials that are less sensitive to the inducement therein of unidirectional molecular orientation during the injection molding process. Accordingly, this nozzle could be used to eliminate such unidirectional molecular orientation and associated weld lines when materials that are less sensitive to these undesirable features, are used. The primary difference between valve gate stem 212 and valve gate stems 12 and 112, discussed above, is that valve gate stem 212 does not include the tapered zones and the dam on the outer surface thereof. That is, after mixing zone M including helical channels 236, a straight zone S immediately follows, as shown in FIG. 4. Preferably, however, the helical path of helical channels 236 has a more aggressive geometry that improves mixing in the mixing zone M and cylindrical zone S between nozzle body 214 and valve stem 212. Accordingly the helical turns of channels 236, these turns are more severe and the helical path more compact, as shown. Referring now to FIGS. 5A–5D, a method for precise and molecularly homogeneous injection molding of compact and digital video discs is shown, using the valve gate injection nozzle as discussed above with reference to FIGS. 1 and 2. In accordance with the following method, an innovative mixing and homogenizing means is shown that contributes to the success of injection molding compact and digital video discs which lack weld lines and unidirectional molecular orientation, in reproducible cycle times.

Figure 5A:
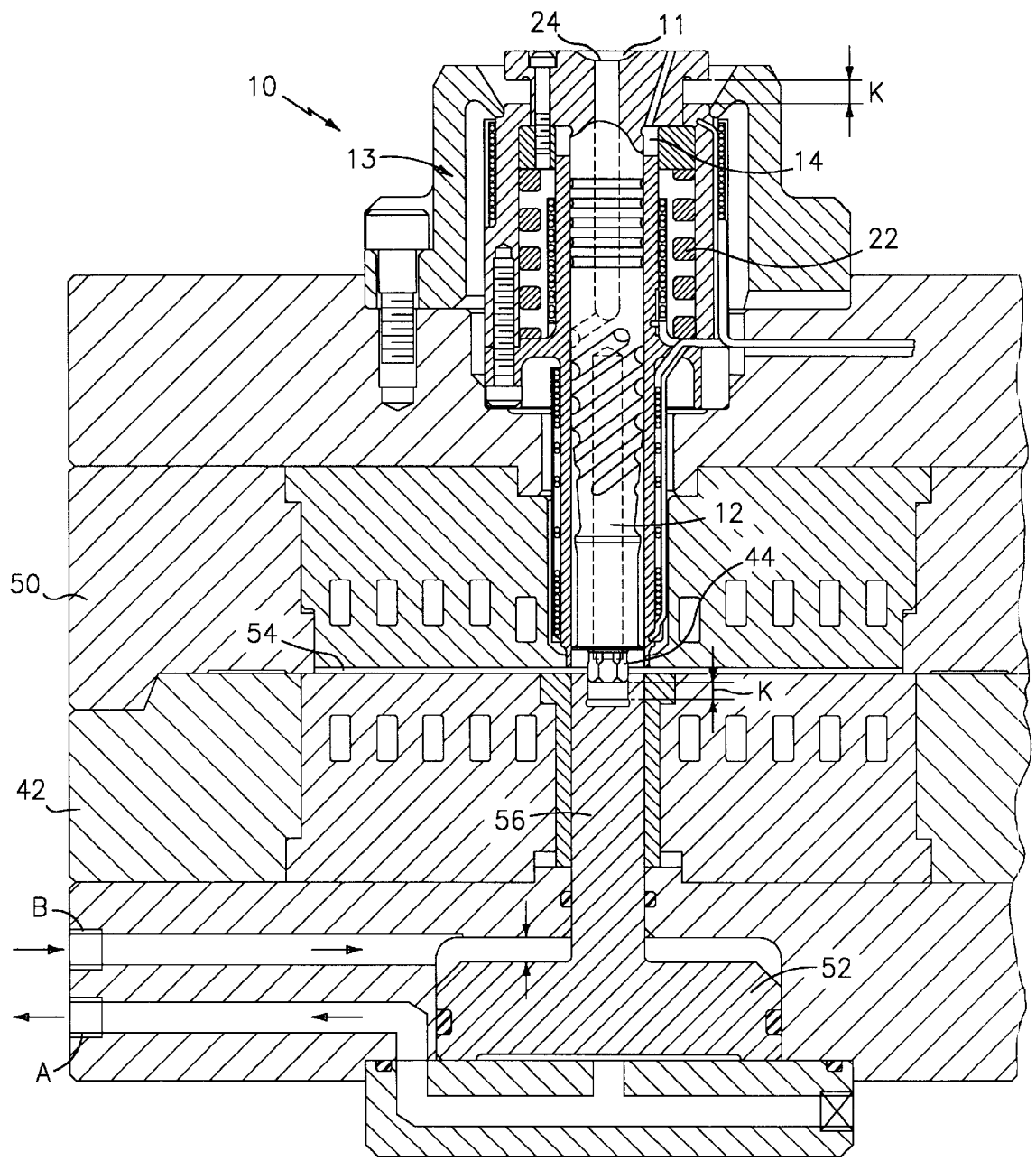
FIGS. 5A–5D illustrate the method steps for forming a high quality molded article, such as a compact or digital video disc, in accordance with the principles of the present invention using the hot runner valve gated nozzle shown in FIG. 1.
Figure 5B:
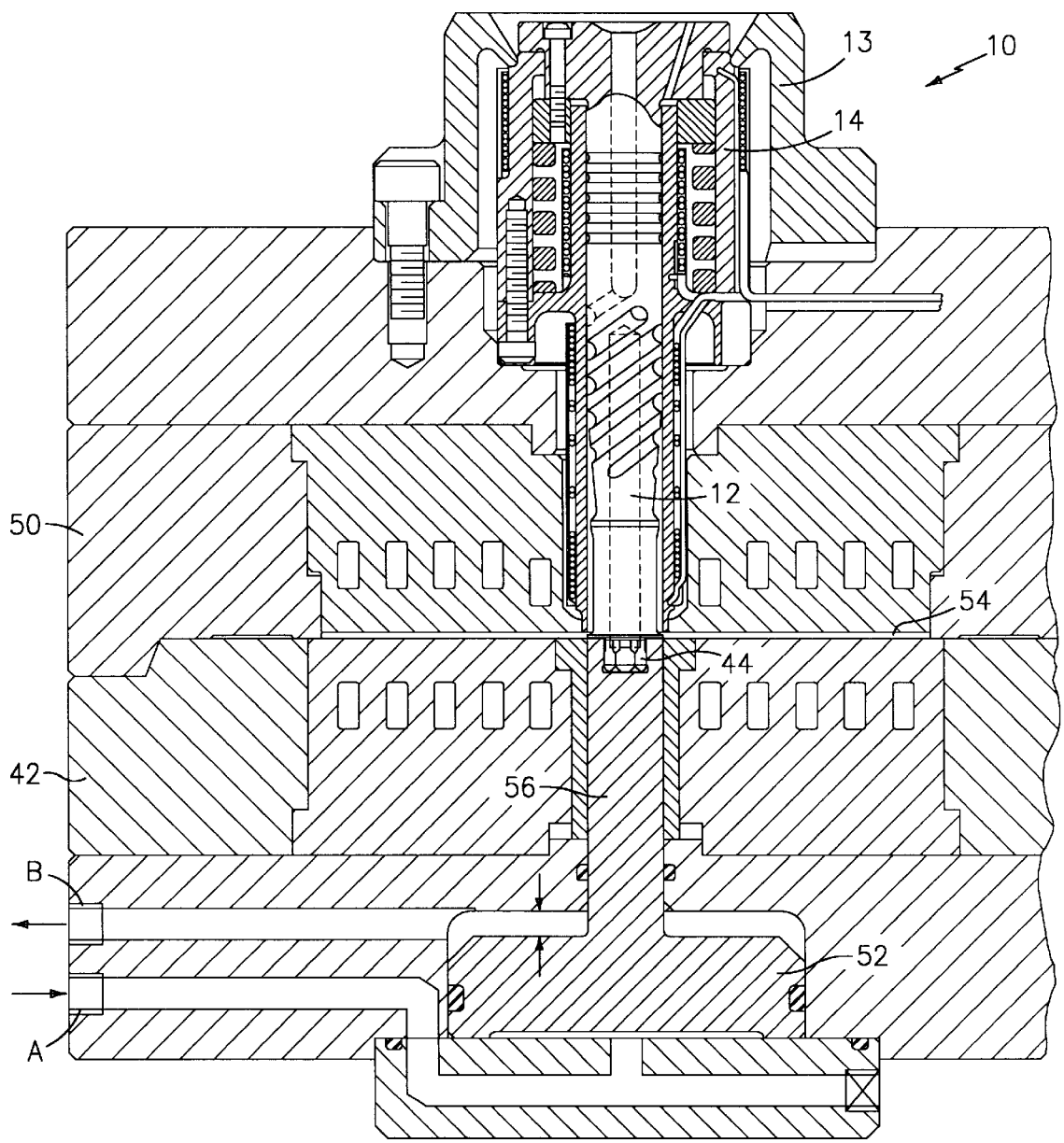
Figure 5C:
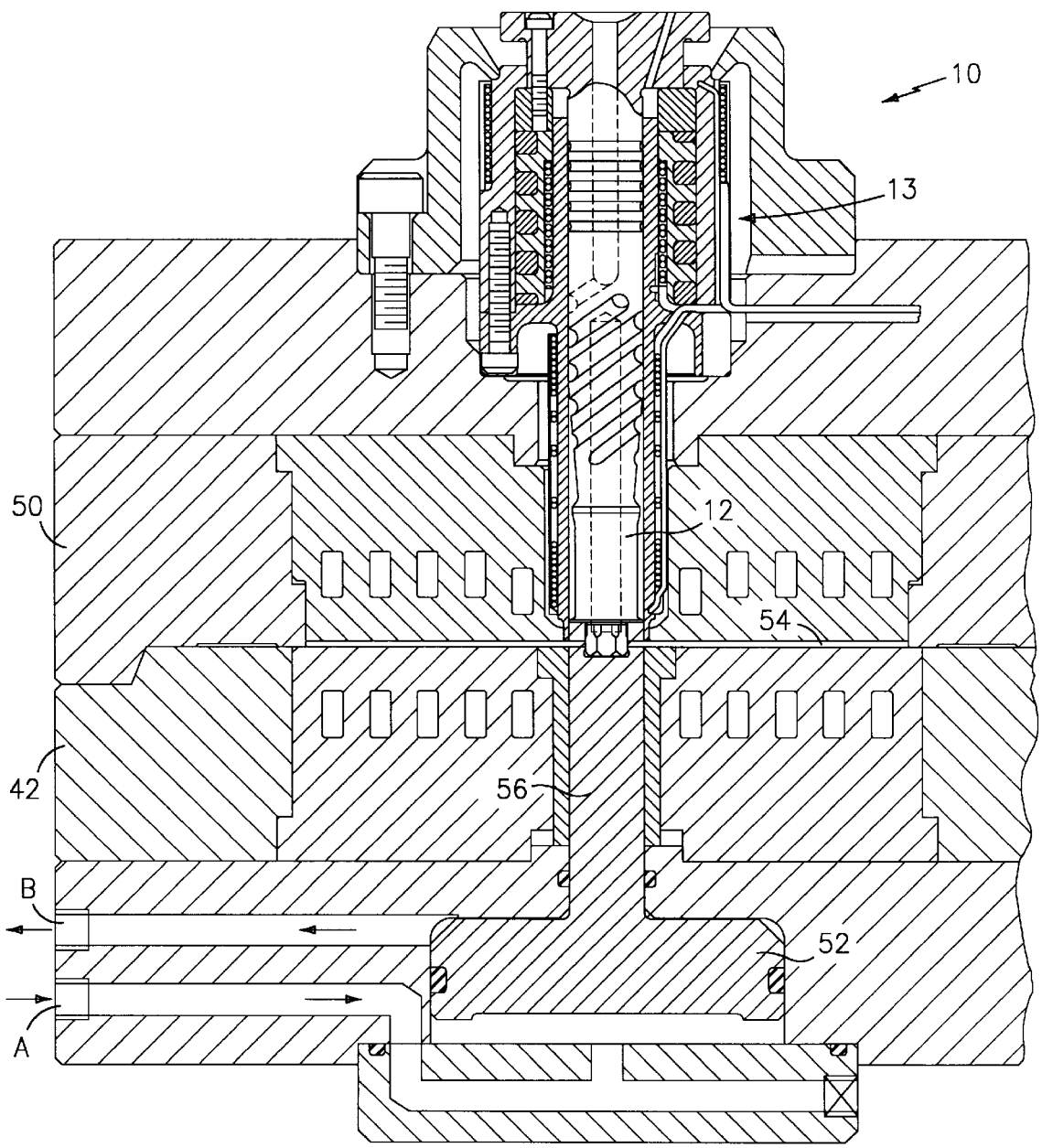
Figure 5D:
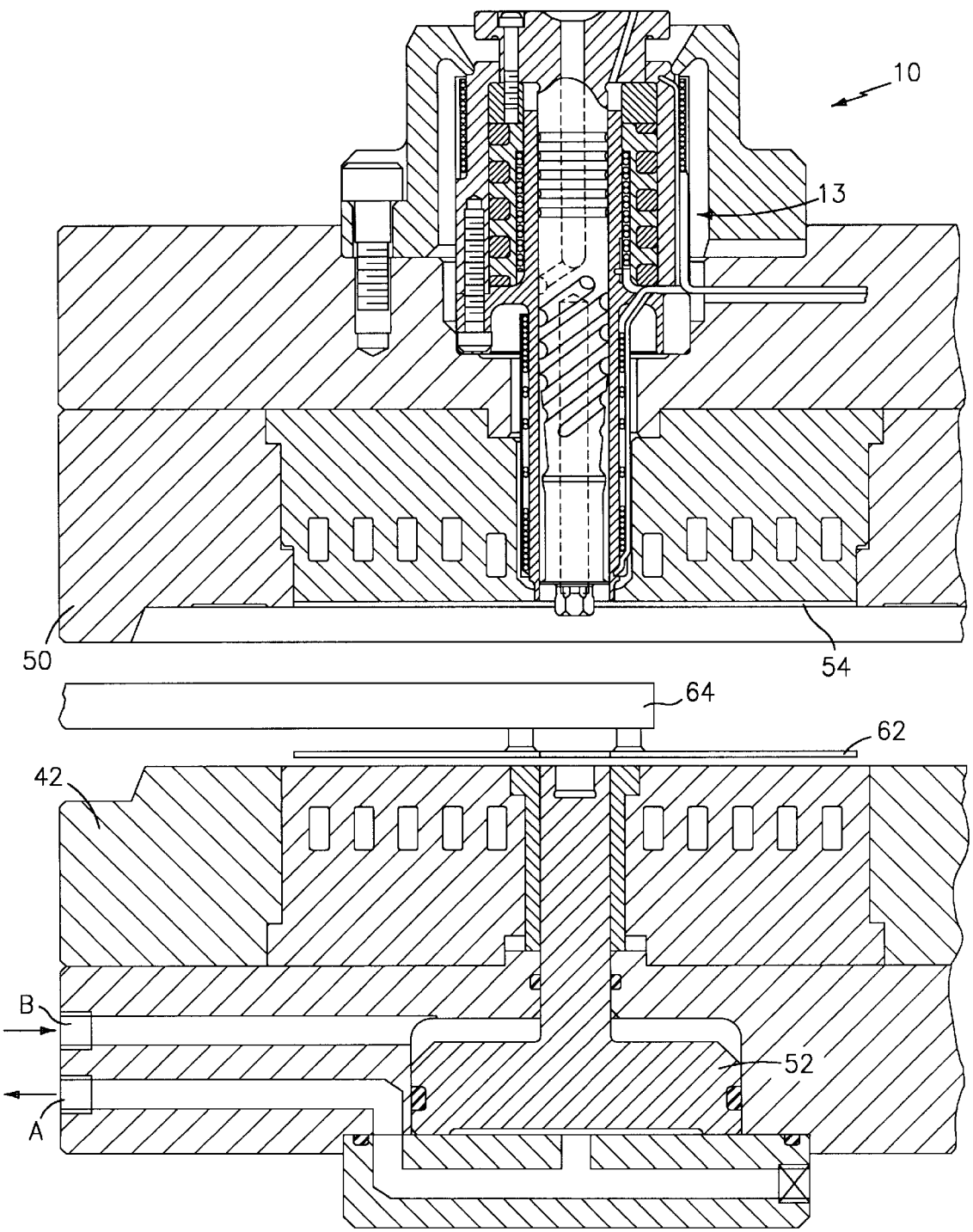
Figure 5E:
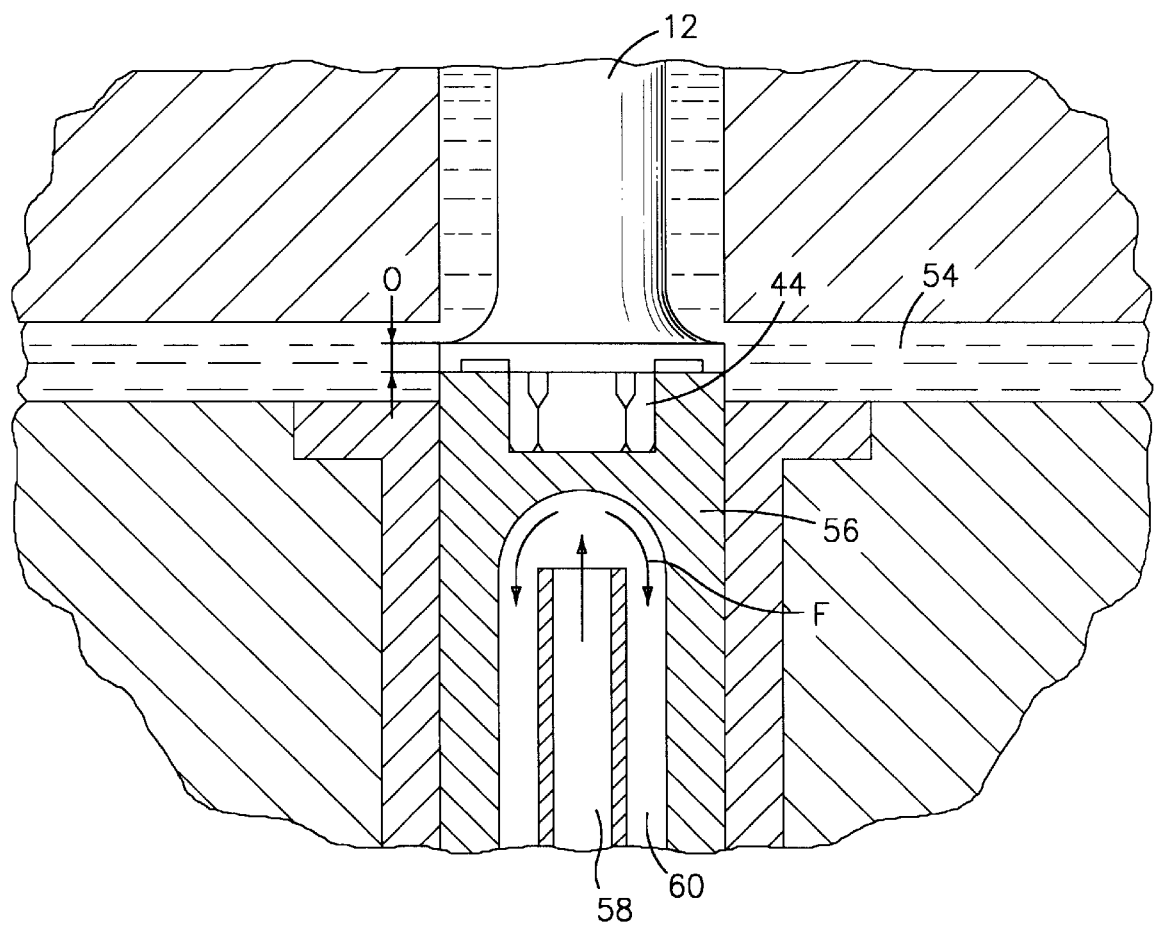
FIG. 5E is an enlarged sectional view of the open gate for allowing molten resin to be injected into a mold cavity for forming a precision molded article such as a compact or digital video disc, in accordance with the method illustrated in FIG. 5A–5D.

Referring now FIG. 5A, to begin injection molding, the injection mold comprising core side 50 and cavity mold 42 are moved to a closed position prior to the injection step. Also, the machine nozzle 11 is in sealed contact with valve stem 12 at entrance end 24, which contact is permanently maintained by compression spring 22 during the entire molding cycle time. An injection unit (not shown) is equipped with double acting stroke cylinders, while a hydraulic cylinder 52 is double action. Accordingly, when the front chamber (not shown) of the injection unit stroke cylinder is pressurized, the injection unit including nozzle 13 is forced to retract. The rear chamber of the injection unit is pressurized with hydraulic pressure which causes the injection unit and nozzle 13 to move forward along distance K so as to open the mold gate via the advancement of valve gate stem 12 and tip portion 44 into cavity mold 42, as shown in FIG. 5B. In this position no contact is achieved until piston 52 is pushed forward by pressure, as shown in FIG. 5E. Also, valve gate stem 12 and hydraulic actuator 56 are in sealed contact caused by the mechanical pressure generated between these elements, which prevents leakage of molten resin. As shown in the enlarged cross sectional view of the mold gate in the open position, FIG. 5E, molten resin is allowed to fill mold cavity 54 under pressure from the machine nozzle which forces the molten resin in a helical movement through mixing zone M of stem 12. In order to reduce heat coming from stem 12, cooling fluid F is brought via cooling conduit 58 and circulated within hollowed core 60 of hydraulic actuator 56. FIG. 5C represents the next step wherein machine nozzle 11, shown best in FIG. 1, is retracted and opposed fluid pressure is applied to hydraulic cylinder 52, in port A, in order to advance hydraulic actuator 56 in a follow-up movement together with the back retraction of stem 12 which is pushed by spring force. The controlled advancement of actuator 56 through mold cavity 54 is intended to create a smooth and accurate sprueless central hole in the injection molding disc that remains in the mold for final cooling before being ejected using an ejection mechanism. The final step is shown in FIG. 5D, wherein when the mold opens and cylinder 52 retracts, disc 62 is released.

Figure 6A:
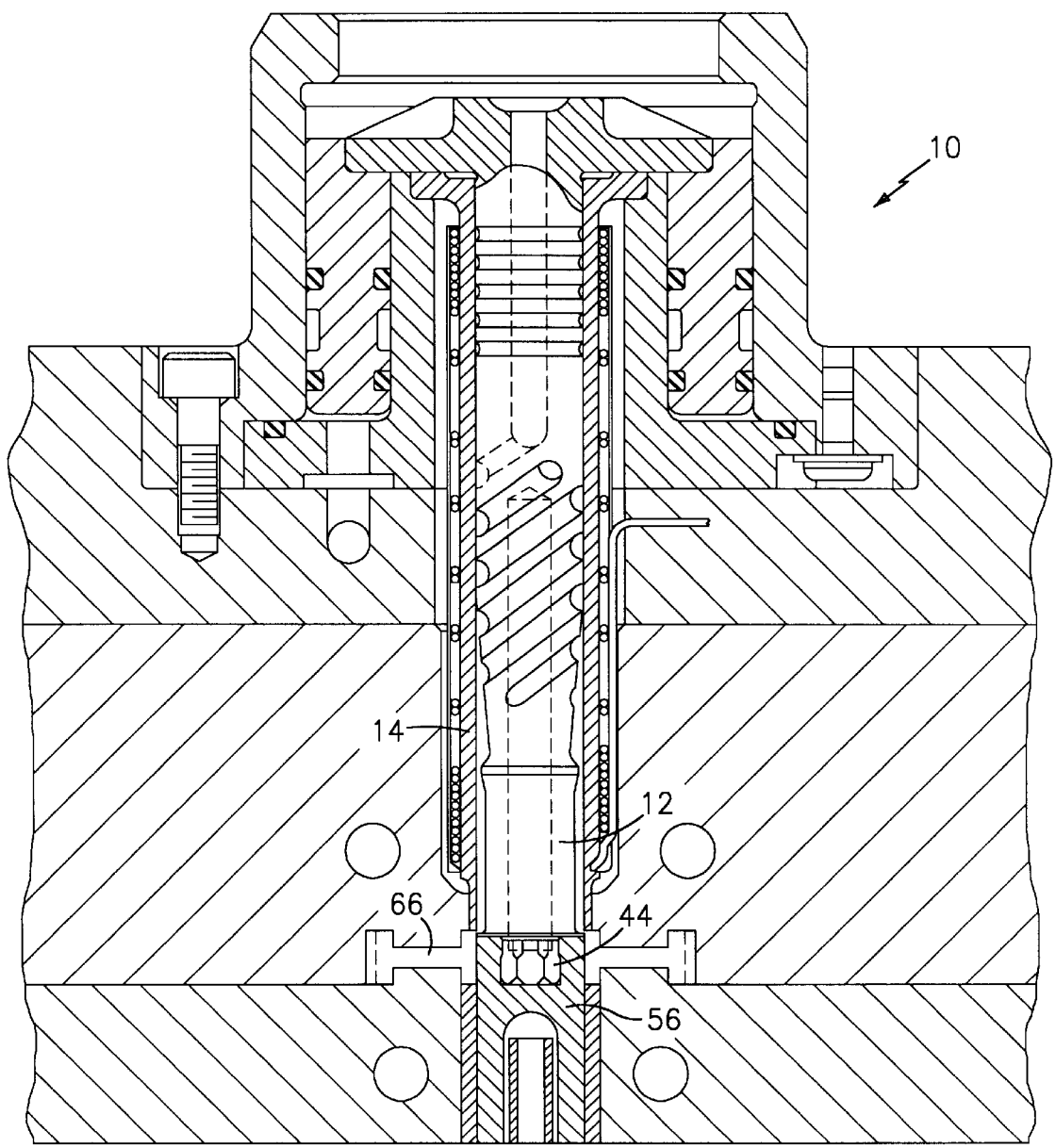
FIGS. 6A and 6B illustrate a method for molding precision gears in a single cavity mold using a hot runner valve gated nozzle as shown in FIG. 1, in accordance with the principles of the present invention.
Figure 6B:
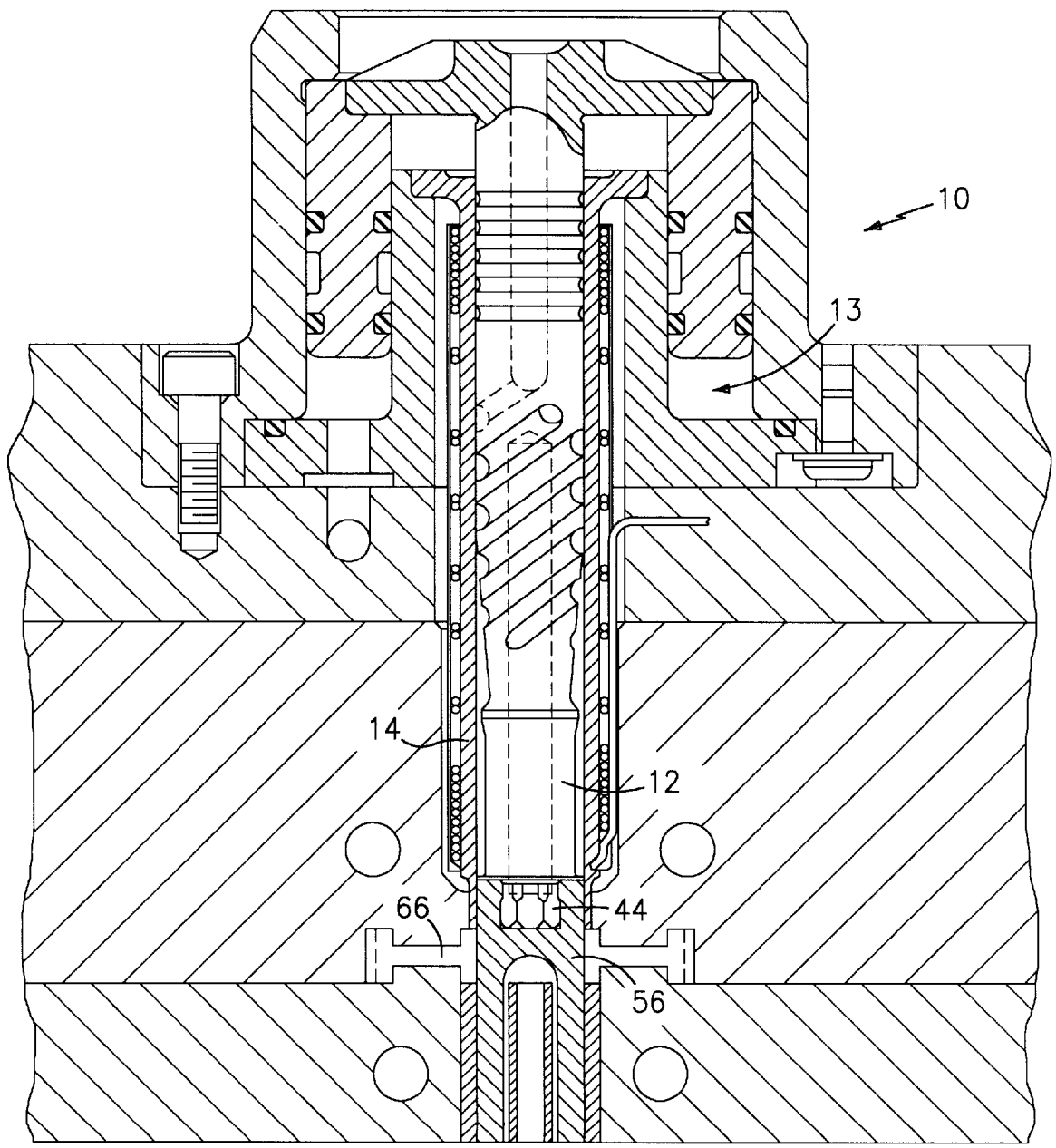

Referring now to FIGS. 6A and 6B, a method similar to that as discussed for FIGS. 5A–5E, using actuator 56 (which may be hydraulic, spring actuated, or pneumatic, or any other desirable means), can be used to inject a different type of resin for forming a precision gear 66, which has a precisely located central hole. While birefringence is not an issue for this type of application, both avoiding weld lines and coring of the central hole can be advantageously achieved using the same apparatus described with respect to FIGS. 1 and 2 and FIGS. 5A–5E, for making compact and digital video discs.

Figure 7A:
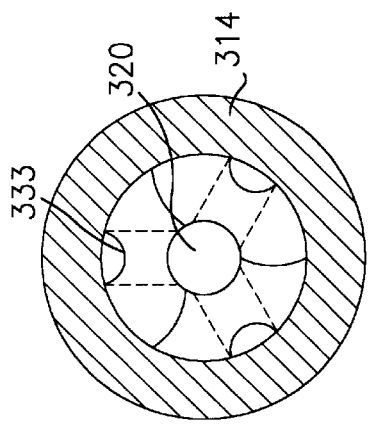
FIG. 7A is a cross-sectional view of one embodiment of the entrance opening arrangement of the valve stem shown in FIG. 7, similar to that shown for FIG. 1A.
Figure 7B:
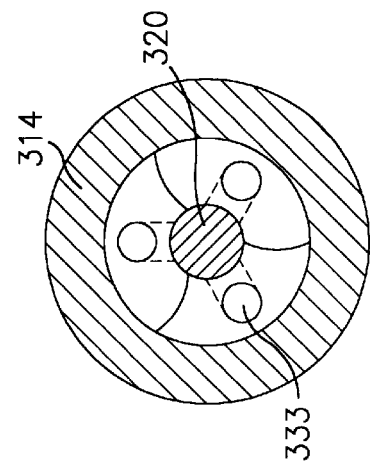
FIG. 7B is a cross-sectional view of another embodiment of the entrance opening arrangement for the valve stem shown in FIG. 7, similar to that shown for FIG. 1B.
Figure 7:
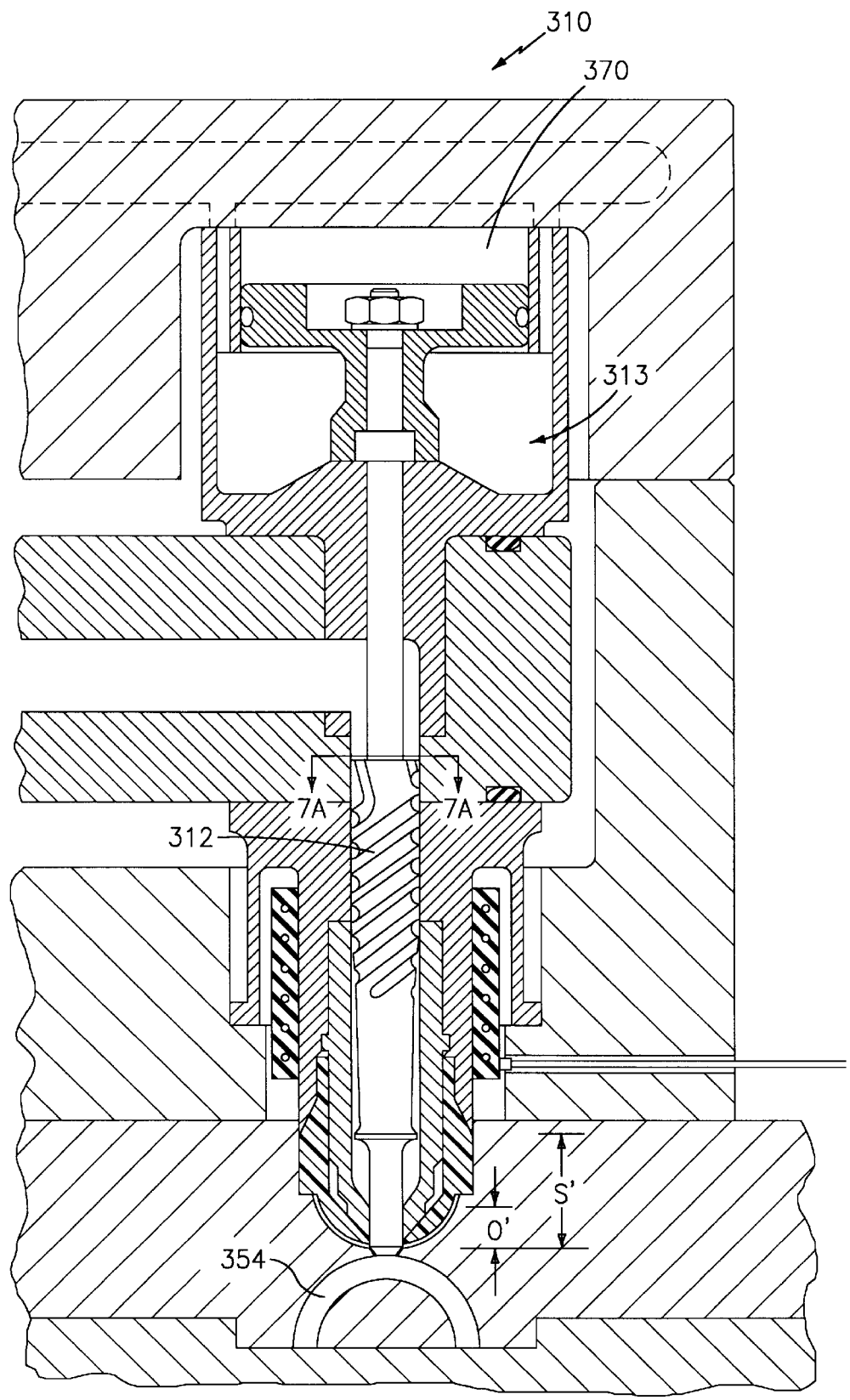
FIG. 7 is a partially cross-sectional view of a multi-cavity mold and hot runner manifold comprising a hot runner valve gate in accordance with the principles of the present invention, and which includes a valve gate stem and a mechanism for actuating the valve gate stem.

Referring now to FIGS. 7, 7A, and 7B, valve gate injection nozzle 313, nozzle body 314 and melt conduit 320, similar to as discussed above with reference to FIG. 3, is shown in use with a multi-cavity mold and a hot runner manifold used to produce high quality PET preforms for forming thin walled containers, wherein the avoidance of weld lines and unidirectional molecular orientation is desired but a central hole is not. In this embodiment, the actuation of valve gate stem 312 is done by hydraulic or air pistons 370 independent of the injection molding machine, representing a difference between this embodiment and the previous embodiments as discussed above. Other wise, the operation of the FIG. 7 embodiment is similar to as that discussed above for FIGS. 5A–5E and similar numerals designate similar elements. FIGS. 7A and 7B, similar to FIGS. 1A and 1B, are representative of the various arrangements of entrance holes 333. For a detailed description of the nozzle and related elements, as shown in FIG. 7, reference is made to U.S. Pat. No. 4,173,448 to Rees et al., assigned to the assignee of the present invention, which is hereby incorporated in total by reference. However, instead of rod 29 shown therein, valve stem 312 of the present invention, as described in detail above with further reference to valve stems 12 and 112, is used. Valve stem 312 includes an extended shut-off zone O' which is a part of the straight zone S', for functioning with the system shown in Rees et al, for cutting off flow of recombined molten resin to the mold cavity.

The primary advantage of the foregoing is that an improved apparatus and method is provided for the sprueless injection molding of high quality plastic articles. Another advantage of the foregoing is that an apparatus and method is provided for the sprueless injection molding of high quality plastic articles, wherein the articles have various shapes, are made from various resins, and do not have weld lines. Yet another advantage of the foregoing is that an apparatus and method is provided for the sprueless injection molding of high quality plastic articles which do not have a unidirectional molecular orientation and/or weld lines. Still another advantage of the foregoing is that an apparatus and method is provided for the sprueless injection molding of high quality plastic articles having a precisely positioned central hole and which do not have unidirectional molecular orientation and weld lines. And yet another advantage of the foregoing is that an improved apparatus and method is provided for homogenizing molten plastic resin in the immediate vicinity of a mold gate prior to injection into the mold. Still another advantage of the foregoing is that a hot runner manifold is provided which comprises an improved hot runner valve gate for homogenizing molten plastic resin in the immediate vicinity of a mold gate. And still another advantage of the foregoing is that an improved injection nozzle is provided for use with an injection molding machine for molding articles with homogenized molten plastic resin for forming molded articles without weld lines and solidified resin having unidirectional molecular orientation.

Figure 8:
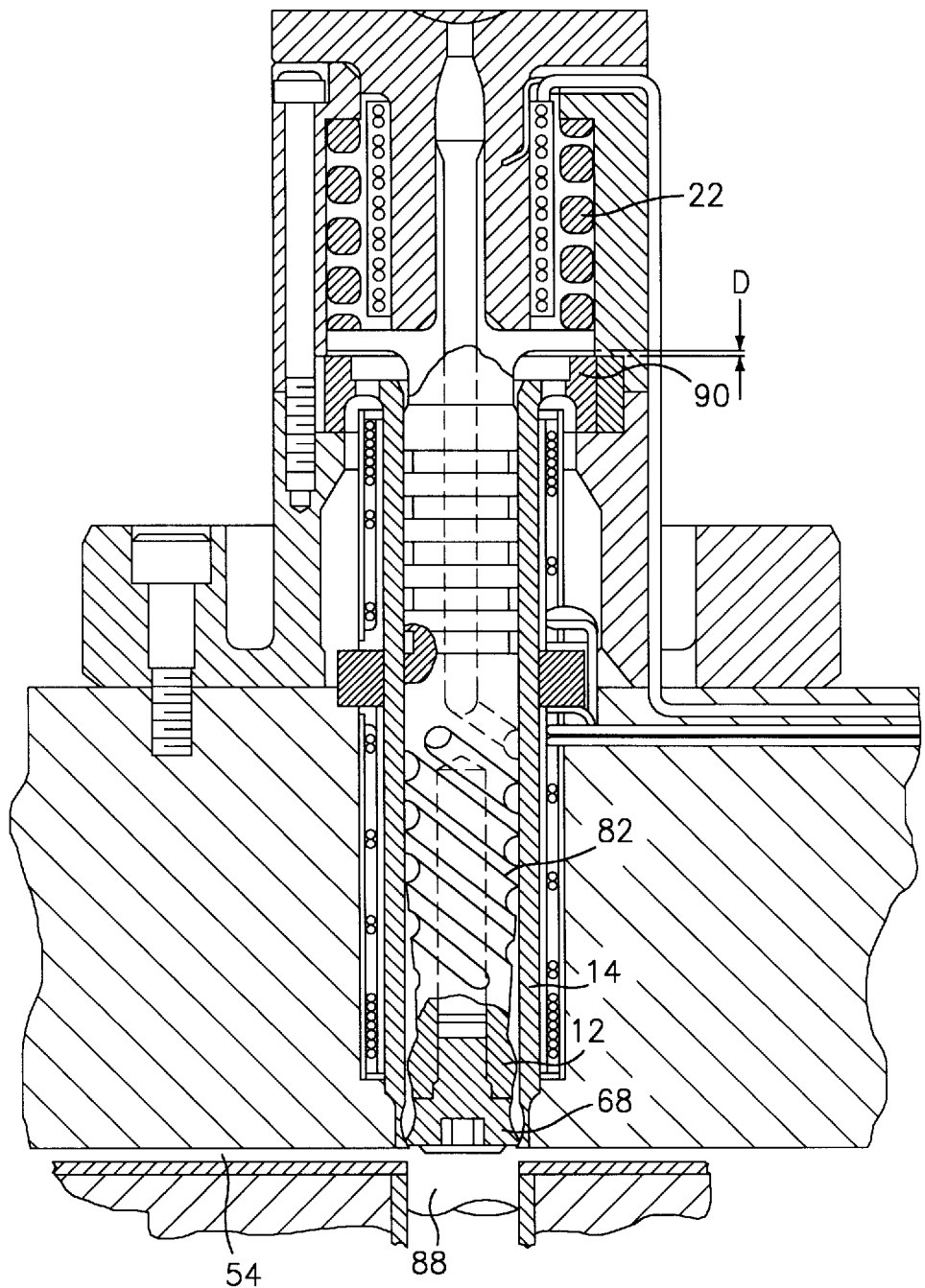
FIG. 8 shows the mold closed and the valve gate assembly of the present invention in the open position for injection.
Figure 9:
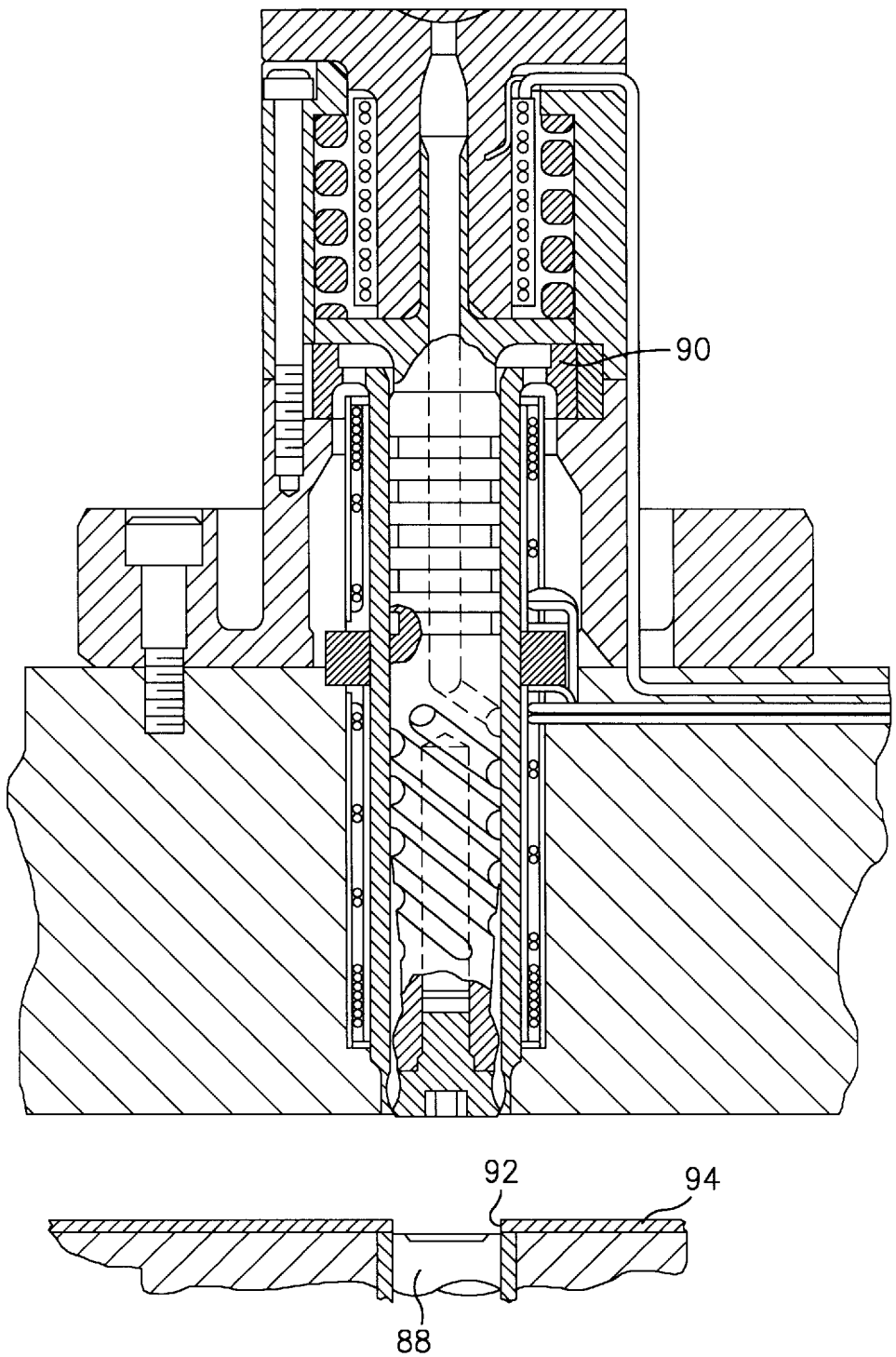
FIG. 9 is similar to FIG. 8 and shows the mold open and the valve closed.
Figure 10:
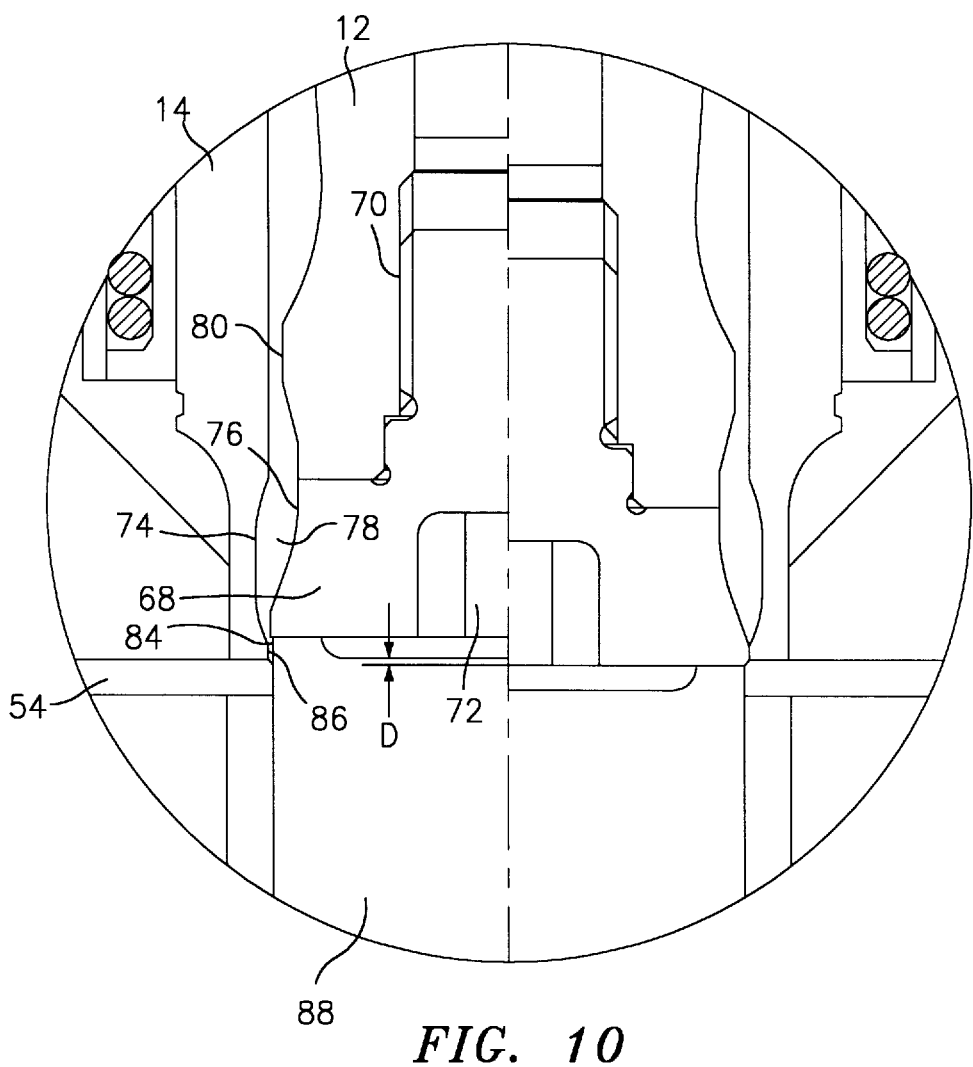
FIG. 10 shows a split view of the details of the valve gate assembly of the present invention, with the left half showing the valve open and the right half showing the valve closed.

The improved valve gate assembly of the present invention is shown in FIGS. 8, 9 and 10. With reference to FIG. 8, which shows the mold closed and the valve in the open position for injection, the features of the valve gate assembly can be clearly seen. Valve stem 12 includes valve head 68 as a forward or downstream portion of the valve stem assembled to the valve stem by thread 70 (see FIG. 10) tightened by means of tool recess 72. The nozzle body 14 includes a recessed annular passage 74 which in combination with the annular shape 76 on the valve stem-valve head combination forms an annular channel 78 where melt accumulates prior to injection. Upstream annular projection 80 on valve stem 12 acts as a dam to modify the melt flow which has passed through mixing unit 82, described above in connection with FIGS. 1–7 inclusive.

The left half of FIG. 10 shows the valve in the open position such that the melt can pass through annular gap 84, formed between nozzle body land 86 and core pin 88 and flow into mold cavity 54. The valve is opened by the forward motion of core pin 88 which pushes on valve head 68 and compresses spring 22. Note that the valve stem is located in one mold half and the core pin is located in the other mold half. The forward stroke of the core pin is shown by dimension "D" in FIGS. 8 and 10 and is limited by the stroke of the cylinder in the core half of the mold (not shown). After mold cavity 54 has been filled and the hold portion of the cycle is completed, the core pin 88 is retracted to close the valve as shown in the right half of FIG. 10. The forward position of the valve is stopped by shoulder 90 clearly shown in FIGS. 8 and 9. After completion of the cooling cycle and during mold opening, core pin 88 is retracted into the core half of the mold as clearly shown in FIG. 9 to clear hole 92 which has been formed in molded part 94.

The foregoing valve gate assembly has proved to create improved flow conditions for filling the part, especially in combination with the mixing unit shown in FIGS. 1–7, producing a weld free and stress free molding. In addition, the gate and core pin combination form a clean, flash free hole with substantially parallel sides.

The annular gate passage 86 is desirably narrow and parallel for a finite length. This creates a local heating effect for the resin as it flows through this restriction and permits a better filling pattern of the mold cavity to make a substantially stress free part. Moreover, the opening of the valve gate is obtained by moving the valve head 68 away from the mold cavity and back into the heated nozzle 14 area so that the head picks up some heat from the melt flowing around it during filling. This functions to counter the cooling effect of the core pin 88 during filling. The core pin 88 is in the cooled core half of the mold and acts like a heat sink while in contact with valve head 68. In addition, desirably the core pin itself forms part of the annular passage for filling in addition to coring the hole in the part. Thus, in accordance with the valve gate assembly of the present invention, the core pin functions to open/close the valve in the opposite mold half. The valve gate assembly of the present invention uses part of the core pin to form part of the gate geometry, and the specific annular shapes of the gate area groove 74 and land 86 form an annular inlet to the mold cavity.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. The process which comprises: guiding molten resin to a molding area via a movable valve stem; enclosing said valve stem with a nozzle body; enclosing a channel means for said molten plastic flow by said nozzle body, wherein said molten plastic flow is in a flow direction; providing a mold cavity for receiving said molten plastic to form a molded part, said cavity formed between cooperating first and second mold halves, wherein the valve stem is situated in the first mold half; transferring molten plastic from said channel means to said mold cavity by an injection orifice downstream of the valve stem communicating with said mold cavity and channel means; and moving a movable core pin forming a portion of the molded part situated in the second mold half downstream of said valve stem and contacting said valve stem between a forward position in a direction opposed to said flow direction opening said injection orifice and a rearward position in a direction in said flow direction closing said injection orifice.

2. Process according to claim 1, including moving the valve stem from a forward position blocking said injection orifice to a rearward position opening said injection orifice, and wherein the core pin moves the valve stem from the forward position to the rearward position.

3. Process according to claim 2, including defining the open position of the injection orifice by an annular channel between a land of said nozzle body adjacent the injection orifice and the core pin, thereby forming an annular inlet to said mold cavity.

4. Process according to claim 2, including blocking the injection orifice by a valve head which defines the forward position of the valve stem, wherein in the closed position of the injection orifice the valve head is operative to block the injection orifice.

5. Process according to claim 2, including accumulating molten resin prior to injection by an annular chamber between the valve stem and nozzle body adjacent the injection orifice.

6. Process according to claim 5, wherein molten resin flow is modified by a projection on the valve stem upstream of the annular chamber which acts as a dam.

7. Process according to claim 6, including forming said annular chamber by cooperating annular shapes of the valve stem and nozzle body.

8. Process according to claim 1, including the step of splitting the molten resin into a plurality of streams in a first zone, partially homogenizing said molten resin in a second zone, and combining said plurality of streams in a third zone, and forming recombined and substantially homogenized molten resin for subsequent direction to an output area connecting to said molding area.

9. Process according to claim 1, including at least in part forming a hole in the molded part by said core pin.

10. A valve gate assembly, comprising:
    a movable valve stem for guiding molten resin to a molding area;
    a nozzle body portion enclosing said valve stem;
    channel means for molten plastic flow enclosed by said nozzle body, wherein said molten plastic flow is in a flow direction;
    a mold cavity for receiving molten plastic to form a molded part formed between cooperating first and second mold halves, wherein the valve stem is situated in the first mold half;
    an injection orifice downstream of the valve stem communicating with said mold cavity and channel means for transfer of molten plastic from said channel means to said mold cavity; and
    a movable core pin forming a portion of the molded part situated in the second mold half downstream of said valve stem and contacting said valve stem and movable between a forward position in a direction opposed to said flow direction opening said injection orifice and a rearward position in a direction in said flow direction closing said injection orifice.

11. An assembly according to claim 10, wherein said valve stem is movable from a forward position blocking said infection orifice to a rearward position opening said injection orifice.

12. An assembly according to claim 11, wherein the core pin is operative to move said valve stem from a forward position to a rearward position.

13. An assembly according to claim 12, wherein said nozzle body includes a land adjacent said injection orifice, and wherein the open position of said injection orifice is defined by an annular channel between the land and core pin forming an annular inlet to said mold cavity.

14. An assembly according to claim 12, wherein said valve stem includes a valve head defining the forward portion thereof, wherein in the closed position of said injection orifice the valve head is operative to block the injection orifice.

15. An assembly according to claim 12, including an annular chamber between the valve stem and nozzle body adjacent said injection orifice for accumulating molten plastic prior to injection.

16. An assembly according to claim 15, including a projection on the valve stem upstream of the annular chamber which acts as a dam to modify melt flow.

17. An assembly according to claim 16, wherein said annular chamber is formed by cooperating annular shapes of said valve stem and nozzle body.

18. An assembly according to claim 10, wherein said valve stem includes an input area for receiving molten resin, a central area following said input area for processing said molten resin and an output area following said central area for connecting to a molding area, said central area including a first zone for splitting the molten resin into a plurality of streams, a second zone for partially mixing and homogenizing said molten resin, and a third zone for combining said plurality of streams and forming recombined and substantially homogenized molten resin for subsequent direction to said output area.

19. An assembly according to claim 18, wherein the second zone comprises a plurality of helical channels, wherein said molten resin flows through the helical channels.

20. An assembly according to claim 18, wherein the first zone comprises a radial molten resin splitter.

21. An assembly according to claim 18, wherein the third zone includes means for partially sending said molten resin back to said second zone for enhancing mixing.

22. An assembly according to claim 10, wherein said core pin at least in part forms a hole in the molded part.

* * * * *